United States Patent [15] 3,646,659

Ragard [45] Mar. 7, 1972

[54] LEAD CUT AND CLINCH MECHANISM

[72] Inventor: Phillip A. Ragard, Binghamton, N.Y.

[73] Assignee: Universal Instruments Corporation, Binghamton, N.Y.

[22] Filed: Sept. 8, 1970

[21] Appl. No.: 70,367

[52] U.S. Cl. .......... 29/203 B, 29/203 D
[51] Int. Cl. .......... H05k 13/04, H01r 43/04
[58] Field of Search .......... 29/203 B, 203 D, 203 DT, 203 R

[56] References Cited

UNITED STATES PATENTS 2,893,010 7/1959 Stuhre .......... 29/203 B

*Primary Examiner*—Thomas H. Eager
*Attorney*—Fidelman, Wolffe, & Leitner

[57] ABSTRACT

An electronic component lead cutting and clinching mechanism having a linkage arrangement whereby the component leads are severed and a channel carries them out of the cutting and clinching area. The mechanism has a linkage attached to a cutting rod, the linkage being attached, in turn, to two pneumatic cylinders, which respectively power an anvil in which the cutting rod is located to bring it up to position beneath a circuit board and operate the cutting rod.

11 Claims, 4 Drawing Figures

INVENTOR

PHILLIP A RAGARD

BY Fidelman, Wolffe & Leitner

ATTORNEY

INVENTOR

BY Fidelman, Wolffe & Leitner

ATTORNEY

INVENTOR

BY Fidelman, Wolffe & Leitner

ATTORNEY

LEAD CUT AND CLINCH MECHANISM

This invention is an improvement over the electronic component lead cut and clinch mechanism shown and disclosed in copending application Ser. No. 876,726, entitled "MultiSize Dual Center Distance Electronic Component Insertion Machine" and filed on Nov. 14, 1969, now U.S. Pat. No. 3,593,404, granted July 20, 1971. The contents of that copending application are hereby incorporated by reference.

In the field of electronic component assembly and insertion, a major step in inserting components into circuit boards is the severing of the extra lead material (needed for handling and processing of the components up to and including insertion) and clinching the remaining leads underneath the circuit board. While clinching is not always performed, as where the completed circuit board is passed over a solder bath, the cutting of the leads is always a necessary step.

In the past, numerous devices have been designed to accomplish the cutting function, however, none of these have proved fully satisfactory.

A major problem has been the power required to sever leads of large diameter necessitating large complex equipment. Another problem has been clogging of the equipment with the severed lead portions necessitating elaborate systems, usually pneumatic, for applying suction to the leads or for blowing them out of the way. The severed lead portions tend to stay in the cutting chamber, thus jamming the cutter on successive lead cutting attempts.

A further major problem has been adjustment. Usually, the circuit board has to be adjusted to the height of the cutting mechanism, a lengthy process. This problem is further complicated by the fact that the cutter may be required to cut different length lead portions. The apparatus presently available is not capable of cutting extremely long lead portions.

In connection with the above adjustment problems there is the added problem of adjusting the length of the stroke of the cutter itself.

The present invention overcomes all the disadvantages previously discussed. Generally, it consists of a linkage assembly mounted on a vertically movable anvil assembly, the linkage assembly and the movable anvil both being powered by pneumatic cylinders. The linkage assembly affords a maximum leverage effect to be obtained to sever even the largest diameter leads. An escape chute connected with the cutting chamber allows the severed leads to be easily and efficiently disposed of.

Accordingly, it is an object of the present invention to provide an electrical component lead severing and clinching mechanism which overcomes all of the previously discussed disadvantages of the apparatus presently available.

It is a more specific object of this invention to provide a novel lead cut and clinch mechanism which is capable of severing large diameter leads.

It is a further object of this invention to provide an electronic component lead cutting and clinching mechanism which is fully adjustable as to its distance from a circuit board and in the length of its stroke.

It is a still further object of this invention to provide a novel lead cut and clinch mechanism which is jam proof and where the severed lead portions are automatically disposed of.

It is a further object of this invention to provide a lead cut and clinch mechanism which has a pneumatically powered linkage assembly for its cutting bar and a pneumatically powered anvil assembly.

There and other objects of the invention will be readily apparent during the following detailed discussion taken with reference to the accompanying drawings in which.

Figure 1:
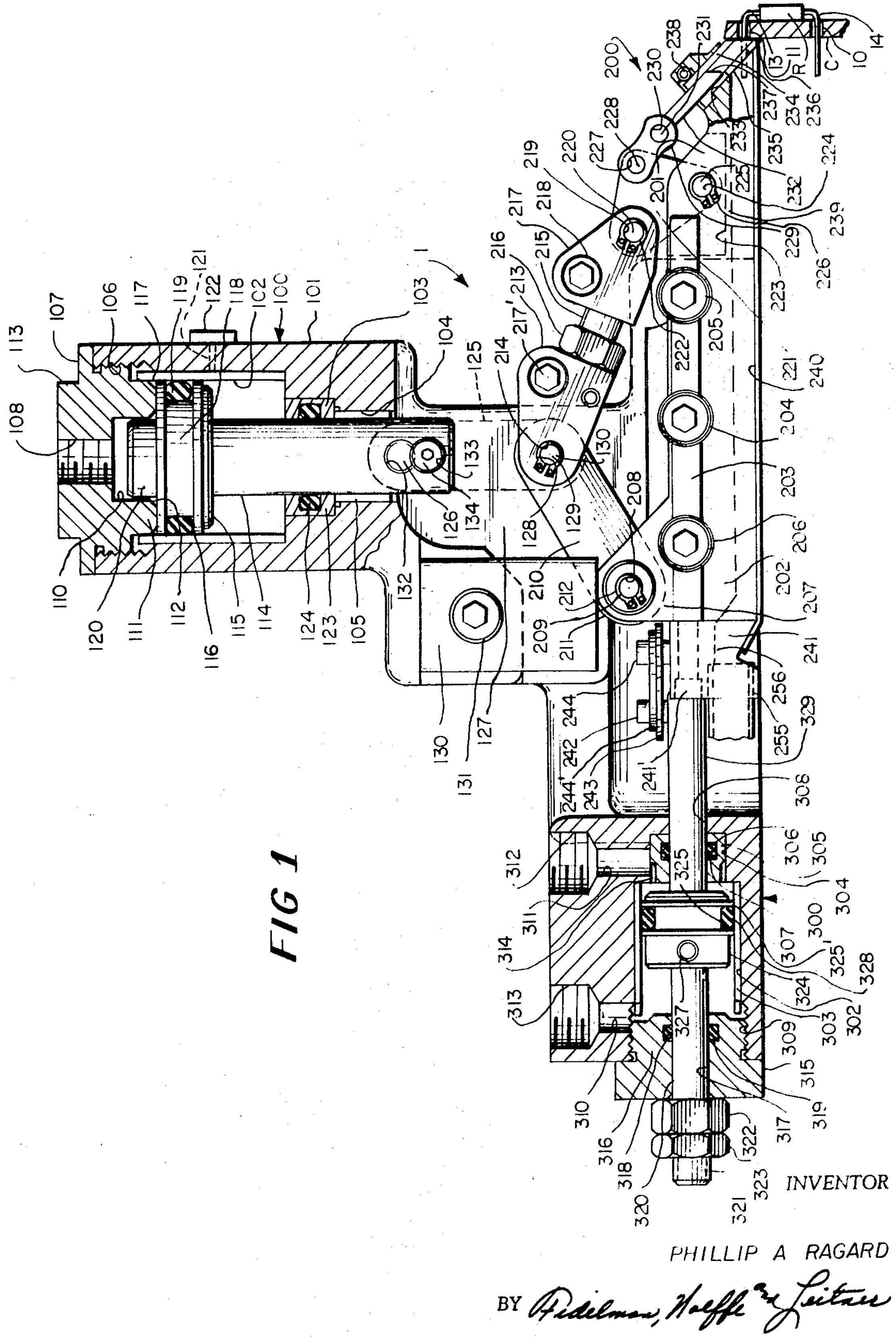
FIG. 1 is a front view of one-half of the cut and clinch mechanism of this invention showing components broken away for the purpose of illustration.

Referring now to FIG. 1, there is shown a cut and clinch assembly 1 which represents one-half of a complete assembly. The other half (not shown) of the complete apparatus is symmetrical with the assembly shown in FIG. 1 and is connected thereto for horizontal movement relative thereto by means to be described.

The two halves of cut and clinch mechanism 1 are mounted for horizontal and vertical movement in a component insertion apparatus beneath the circuit board, such as C in FIG. 1. A component designated as R is inserted into the circuit board C with its leads 13, 14 extending down into the predrilled holes 10,11 in the board.

The assembly 1, together with its symmetrical half, receives a signal from the tape reader or computer that is controlling the insertion equipment which informs it of the lead spacing, shown as X in FIG. 1. The two components move either closer together or further apart or stay where they are, depending on the value of X as compared with the lead center distance of the component previously inserted. The apparatus does not move since the board moves on command on an X–Y table to a point where the middle of the distance between the lead holes 10,11 is aligned with the halfway point between assembly 1 and its symmetrical half.

Figure 2:
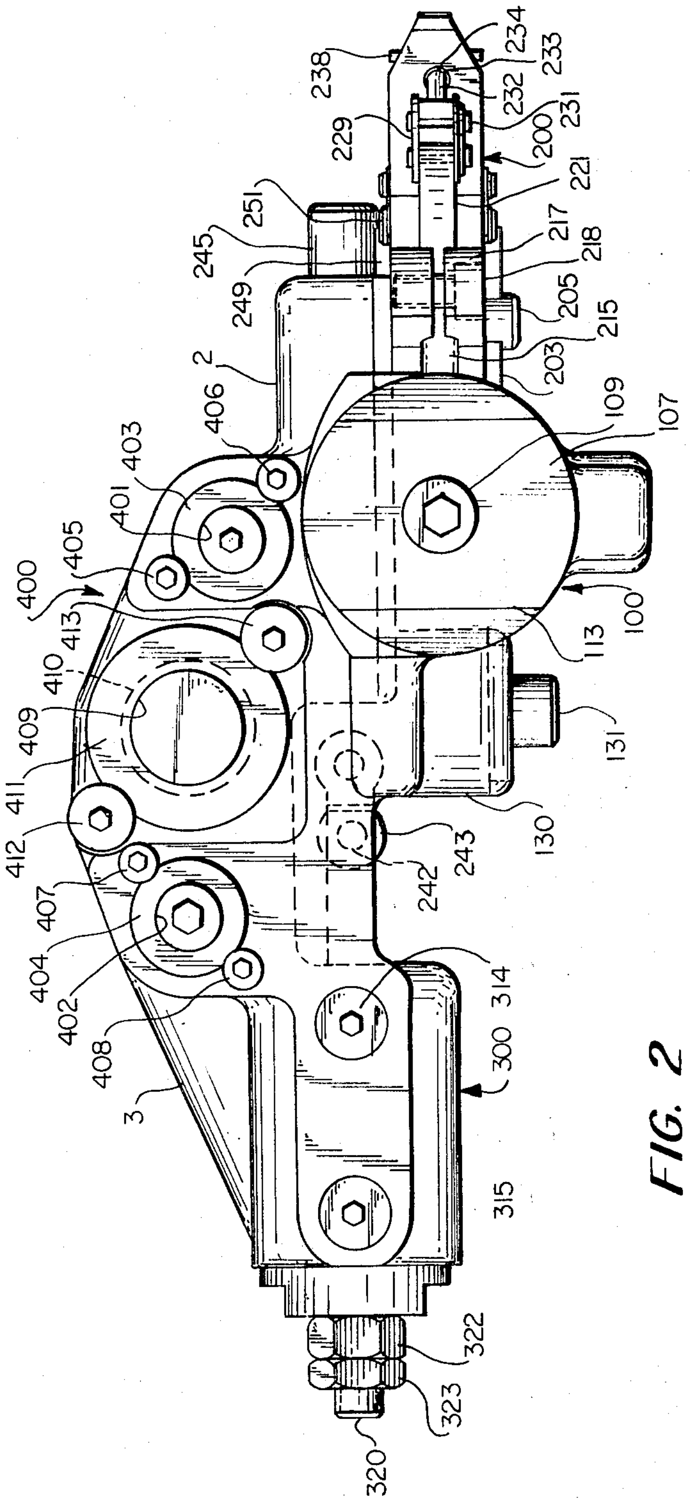
FIG. 2 is an end view of the mechanism of FIG. 1 showing the assembly bores for horizontal movement.
Figure 3:
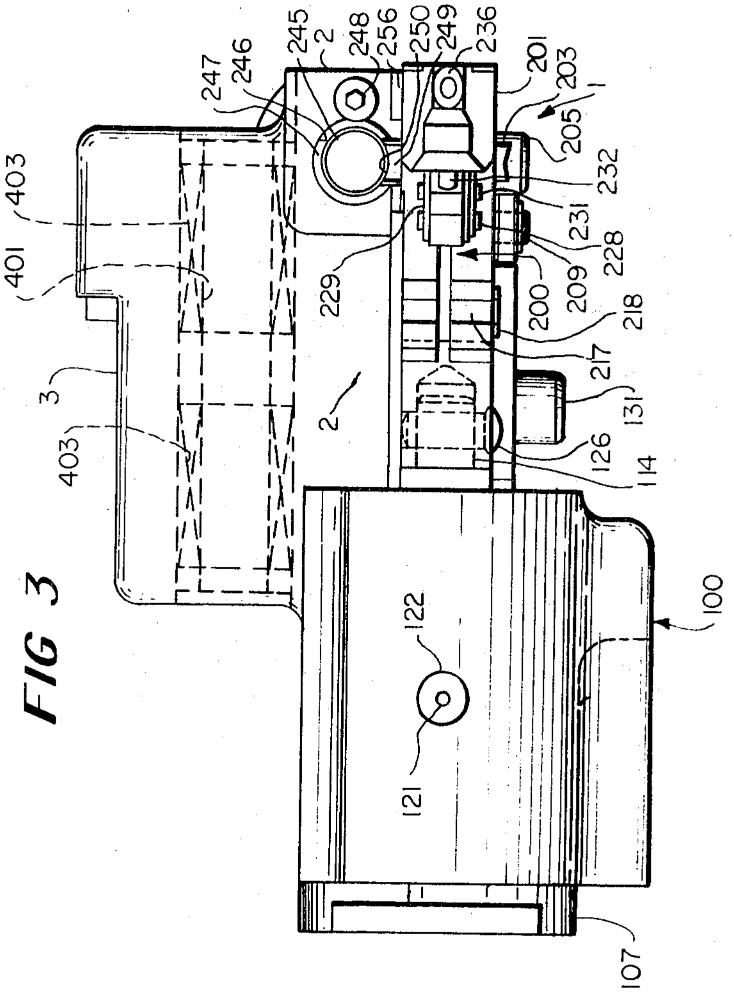
FIG. 3 is a top view of the mechanism of FIG. 1 showing the relationship of the cutter linkage assembly to the remainder of the apparatus.

The cut and clinch assemblies rise until the leads 13 and 14 enter the lead severing and anvil anvil assembly, designated generally as 200 in FIGS. 1–3, by the action of pneumatic cylinder designated generally as 300. The cutting pneumatic assembly, 100, then is activated and the lead is severed. The assembly 1 and its symmetrical half then move down by the action of cylinder 300, and the cutter retracts by the action of cylinder 100.

As shown in FIG. 1, cylinder 100 comprises a housing 101 having an internal chamber or bore 101′. Bore 101′ has a liner 102 adapted to cooperate with a piston to seal the chamber pneumatically. There are smaller counterbores 103 and 104 having bushings 123 and 105, respectively. Bushing 123 is a metal bushing of an inverted C-shape with a rubber gasket 124 therein.

The opposite end of chamber 101′ is internally threaded as at 106 to receive an end plug 107 which screws into the end of housing 101. It has a squared-off projection 113 (FIG. 2) by which it may be removed. It also has threaded bore 108 which is adapted to receive a pneumatic fitting, not shown. A larger counterbored area 110 receives the end 120 of piston rod 114 and portion 111 seals liner 102 against housing 101.

Piston rod 114 has an enlarged portion 115 and recess 118 formed between flanges 116 and 117. A sealing ring 119, formed of resilient material, such as rubber, is fitted between the flanges. An air escape port 121 is located approximately midway in the chamber 101′ for a purpose to be described.

The other end of piston rod 114 has a bore 132 therein which receives a pin 126. Pin 126 connects a pair of links, only one shown in dotted lines as 125, to rod 114. A relieved bore 133 receives a screw 134 which locks pin 126 in place. The other ends of links 125 receive a pin 129 through holes 128. The pin 129 attaches the links to linkage member 213 and to bar 210 and is held in place by retaining ring 130.

The cylinder assembly 100 is held in place on main frame 2 by a screw 131 passing through flange area 130. The area around the connection between links 125, member 213 and bar 210 is relieved as at 127 to allow for movement of said members.

CUT AND CLINCH ASSEMBLY 200

As shown in FIGS. 1–4, the cut and clinch assembly is shown generally as 200. It consists of a vertically slidable main anvil member 201 having a central portion 202. Secured to each side of portion 202 by machine screws 205, 204 and 206, are a pair of guide members 203.

A projection portion 207 has a bore 208 therein which receives pin 209. Pin 209 secures bar 210 to portion 207 for pivotal movement therebetween. A snapring 212 and washer 211 keep the pin in place.

Member 213 is composed of two halves (FIGS. 2 and 3) secured together by machine screw 217. It is attached, as stated before, to link 125 for pivotal movement by pin 129 received in bore 214. The two halves of 213 receive a threaded rod 215 which is adjustable therein by adjustment nut 216. The other end of rod 215 is received in member 217 which is almost identical to member 213. The rod is changed in place by screw 218. A bore 219 in member 217 receives a pin 220 therein which secures triangular pivot member 221 thereto for pivotal movement. A snapring 222 maintains pin 220 in place.

Member 221 is secured to anvil member 201 by a pin 225 mounting it in bores 224 on each side of relieved area 223. Pin 225 is maintained in place by snapring 226. The other corner of member 221 has a bore 227 therein which receives pin 228 which, in turn, is received by bores in links 229 and 229'.

Links 229 and 229' have a second set of bores 230 therein which receive a pin 231 to which is attached cylindrical cutter rod 232.

Rod 232 is mounted within bushing 234 which is received within a cylindrical bore 233 in the top of anvil member 201. A pin 238 maintains bushing 234 in the anvil member.

The end of rod 232 is beveled as at 237 so as to be even at the top of its stroke with beveled bushing face 236. The lower portion of bushing 234 has an aperture 235 therein which, as shown in FIG. 1, allows leads of electronic components to extend down thereinto.

The rear of portion 202 is slotted as at 239 and the slot has a cover plate 240 mounted thereover, by any suitable means, so as to provide a slot by which cut lead portions, regardless of their length, may escape down to a location underneath the assembly to be disposed of. A member 241 is attached to the base of 202 by screw 241' and has a relieved area 256 which receives a suction hose 255 by which the cut portions are evacuated.

A pin 244 is mounted in section 241 which extends away from the receiver of FIG. 1 to a position over assembly 300, as shown in FIG. 2.

Pin 244, through rigid, nonpivotable links, 243 and 244, connects section 241 with pin 242 which is attached to the end of a piston rod 329.

VERTICAL CYLINDER ASSEMBLY

Referring to FIG. 1, there is shown the cylinder assembly for imparting vertical motion to the anvil assembly. It consists of a housing 301 having an internal cylindrical chamber 302 therein with a liner 303 mounted therein. Chamber 302 communicates with a smaller chamber 304 in which is mounted C-shaped bushing 305 which, in turn, surrounds a gasket 306. The inner peripheral edge of bushing 305 is relieved as at 314' so as to allow air to enter from port 311. Port 311 has an enlarged threaded portion 312 which is adapted to receive a pneumatic fitting (not shown).

The other end of chamber 302 is internally threaded at 309 to receive threaded end plug 315. A second port 310 communicates with that part of chamber 302 adjacent to plug 315. Port 310 has an enlarged internally threaded portion 313 adapted to receive a second pneumatic fitting for the port (not shown).

Received within bore 308 in housing 301 and bore 317 in plug 315 is piston rod 320. The end thereof is threaded as at 321 to receive adjustment nuts 322 and 323, used to adjust the length of stroke of the rod 320.

A seal 319 is located in an annular recess 318 in bore 317 in plug 315.

Mounted on piston rod 320 is piston 324 having flanges 325 and 325', between which is located a resilient compression ring 328. A screw 327 maintains piston 324 on rod 320.

HORIZONTAL MOVEMENT ASSEMBLY

As shown in FIGS. 2 and 3, there is an assembly generally designated as 400. The assembly has two smooth bores 401 and 402 in which are received transverse rods (not shown). The transverse rods are also mounted in similar bores on the other half of the cut and clinch assembly, not shown, which is a mirror image to the device shown in FIGS. 1–3. The ends of said rods are supported by frame members on each end and allow the symmetrical assemblies to slide toward and away from each other to accommodate varying distances between component leads.

Bores 401 and 402 have bearing inserts such as 403 and 404 as seen in FIGS. 2 and 3. The inserts are maintained in the bores by spacers and locking washers 405, 406, 407 and 408.

Located between bores 401 and 402 is another larger bore 409. The purpose of bore 409 is to accommodate either a shaft, in which case it is smooth, or a screw, in which case it is internally threaded as at 410. If it is threaded, the threaded shaft (not shown) will be driven so that the assembly can accommodate an infinite number of different lead spacings on the components, i.e., variable center distance between the parallel portions of leads 13 and 14. If only two center distances between leads are used, then stops are used in conjunction with a smooth shaft so that the two symmetrical cut and clinch assemblies are always separated by one of two know distances. A flange 411 is used to maintain inserts on bearings (not shown) within bore 409 and is maintained in place by locking washers 412 and 413.

GUIDES FOR VERTICAL ANVIL MOVEMENT

Figure 4:
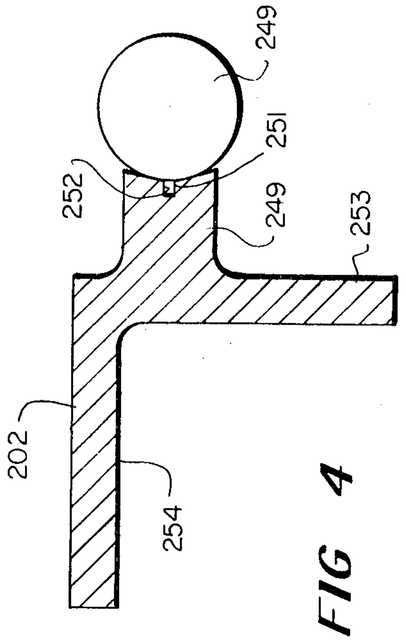
FIG. 4 is a partial sectional view of a portion of the cutter linkage assembly and its relationship to the guide rod.

Referring now to FIGS. 2–4, there is shown a cylindrical guide member 245 which is mounted in assembly 1. As shown in FIG. 4, it has a raised, generally rectangular ridge 251 along its length thereof.

Main anvil member 201 has a projection 249 thereon which has an inwardly beveled edge with a notch 252 which accommodates ridge 251. As seen in FIG. 1, projection 249 has a counterpart 203 on the opposite side of member 201 and it has breaks therein to accommodate machine screws 204, 205 and 206.

Edges 253 and 254 of member 202 engage the rear and sides of the main anvil assembly 201.

Member 245 is received with a bore 246 in assembly 1, the main casting and is secured therein by an insert 247.

The periphery of 245, 250 rides on the beveled edges of projection 249 with ridge 251 riding in notch 252. This guides the anvil assembly up and down as it is powered by the pneumatic cylinder assembly 300.

OPERATION

The operation of the device is as follows:

The clinch cylinder assembly 100 is back (to the left in FIG. 1) and the vertical cylinder assembly 300 is down. The assembly 1 and its symmetrical counterpart are positioned beneath the approximate lead holes in the circuit board. At this time, the spacing between the assemblies is accomplished. This can be done through servomotors (not shown) operated by either a tape reader or direct computer control.

Vertical cylinder (and its counterpart on the symmetrical portion of the apparatus are then powered and the anvil assembly 201 is raised to where the top of the anvil assembly(s) is just beneath the circuit board C.

At this point, the component R, with its leads bent, as shown in FIG. 1, is inserted into the circuit board holes and the ends of the leads extend into housing 234, through aperture 235 and into slot 239.

Cylinder assembly 100 is then actuated and the clinch mechanism 200 forces rod 232 through bushing 235 to sever the lead and clinch the remaining portion. The severed portion of the lead drops into slot 239 and is evacuated via hose 255.

Once the lead is severed and clinched, assembly 100 retracts rod 232.

The assembly 300 then brings the anvil assembly down to enable the whole mechanism, as the board shifts on an X–Y axis, not to engage the already clinched lead portions. This step is also necessary if there is a pocket in the circuit board that the anvil assembly has to go up into to cut and clinch the lead.

The hole 121 in assembly 100 has a pneumatic hose (not shown) connected thereto and a sensing mechanism (not shown) is connected to said hose. The physical parameters of cylinder assembly 100 are such that when the piston is all the way to the right, as seen in FIG. 1, the rod 232 has cut and clinched the lead. Not until the piston is all the way forward is the hole 121 uncovered to the air pressure behind (to the left, in FIG. 1) the piston. This added pressure in hole 121 and its hose tells the sensing mechanism that the cutting and clinching mechanism is complete.

The mechanism is more trouble-free and accurate than prior cut and clinch devices. It is now possible to adjust the clinch mechanism 1 to the circuit board; this is done by adjusting nuts 322 and 323 on cylinder assembly 300, rather than adjusting the circuit board to the clinching mechanism.

The amount of clinch can be varied simply by adjusting nut 216 which will vary the length of stroke of rod 232.

The slot 239 allows for any length lead to be cut and prevents any build-up of severed lead portions near the working head portion of the anvil assembly.

The device also facilitates, through the particular linkage assembly, cutting through much thicker leads. The device has severed steel leads over 0.047 inches in diameter. The linkage also prevents overthrow due to the small amount of movement at the end of the stroke.

The provision for pneumatic sensing (hole 121) eliminates the need for any microswitches to operate the timing sequence of the device.

It will, of course, be obvious to those skilled in the art, that many changes, modifications and refinements may be made to the apparatus without departing from the scope of the appended claims.

What is claimed is:

1. An apparatus for cutting and clinching leads of electronic components projecting beneath circuit boards, said apparatus comprising at least one housing, means supporting said housing for longitudinal movement, means for moving said housing longitudinally, an anvil assembly mounted for vertical movement on said housing, lead cutting and clinching means on said anvil assembly, a first piston means to impart a sinusoidal motion stroke to said cutting and clinching means, a second piston means for moving said anvil assembly vertically to place said cutting means in position to cut and clinch leads, said second piston means being associated with said first piston means and means adapted to carry said severed lead portions away from said cutting and clinching means.

2. An apparatus as in claim 1 including a linkage means connecting said first piston means to said cutting and clinching means and to said anvil assembly.

3. An apparatus as in claim 2 wherein said cutting and clinching means comprises a rod having a beveled cutting and clinching end, said rod received within a bore in said anvil assembly.

4. An apparatus as in claim 3 wherein said linkage means comprises a pivotable member pivotally mounted on said anvil assembly, means pivotally connecting said rod to said pivotable member, an adjustment member pivotally connected to said pivot member and said first piston means, said adjustment member having means by which its length may be varied, a link member pivotally connected to said pivotable connection between said adjustment member and said first piston means at one end and to the lower end of said anvil assembly at its other end.

5. An apparatus as in claim 4 wherein said first piston means imparts a horizontal stroke and said second piston means imparts a vertical stroke whereby when said second piston means raises said anvil assembly to a cut and clinch position beneath a circuit board, it cocks the linkage assembly so that when said first piston means is actuated, it imparts a sinusoidal motion to said rod and tends to lock the linkage assembly in place at the end of the stroke.

6. An apparatus as in claim 5 wherein said means adapted to carry away severed lead portions comprises a slot in said anvil assembly, said slot being in open communication with said cutting rod bore, the lead portions adapted to extend down into said slot prior to being severed.

7. An apparatus as in claim 1 wherein said lead cutting and clinching means includes a rod, said cutting rod being received within a bore in said anvil assembly, said means adapted to carry away severed lead portions comprising a slot in said anvil assembly, said slot being in open communication with said cutting rod bore, the component lead portions extending into said slot prior to being severed.

8. An apparatus as in claim 7 including a suction means connected to the bottom of said slot.

9. An apparatus as in claim 1 wherein said first and second piston means comprise cylinders with pneumatically operated pistons, said first cylinder being single action and having one port and a means to sense air pressure when said first piston nas completed its stroke, and said second cylinder being double action and having two ports.

10. An apparatus as in claim 1 and including guide means on said housing adapted to guide the upward and downward movement of said anvil assembly.

11. An apparatus as in claim 2 wherein said anvil assembly has a horizontal planar top portion, a bore in said portion, a tubular insert in bore and having a beveled end portion, said cutting and clinching means including a rod mounted in said bore for sliding movement, said rod having a beveled cutting end portion, the beveled surfaces of said insert and rod being coplanar with said top portion surface when said rod is at the clinching end of its stroke.

* * * * *